(12) United States Patent
Fuechtling

(10) Patent No.: US 9,220,198 B2
(45) Date of Patent: Dec. 29, 2015

(54) HEADER WITH DRIVABLE CROP CONVEYING ELEMENTS

(71) Applicant: CLAAS SELBSTFAHRENDE ERNTEMASCHINEN GMBH, Harsewinkel (DE)

(72) Inventor: Christian Fuechtling, Rinkerode (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 0 days.

(21) Appl. No.: 14/224,813

(22) Filed: Mar. 25, 2014

(65) Prior Publication Data

US 2014/0298765 A1    Oct. 9, 2014

(30) Foreign Application Priority Data

Apr. 4, 2013   (DE) .......................... 10 2013 103 381

(51) Int. Cl.
  *A01D 43/00* (2006.01)
  *A01D 61/02* (2006.01)
  *A01D 57/20* (2006.01)
(52) U.S. Cl.
  CPC ................ *A01D 61/02* (2013.01); *A01D 57/20* (2013.01)
(58) Field of Classification Search
  CPC ....... A01D 41/14; A01D 43/06; A01D 57/20; A01D 61/002; A01D 61/02
  USPC ....... 56/181, 153, 10.2 R; 3/181, 153, 10.2 R
  See application file for complete search history.

(56) References Cited

U.S. PATENT DOCUMENTS

| 7,827,773 | B2 * | 11/2010 | Sauerwein et al. ............. 56/181 |
| 8,205,422 | B2 | 6/2012 | Sauerwein et al. |
| 8,272,198 | B1 * | 9/2012 | Allochis ......................... 56/153 |
| 2002/0129591 | A1 * | 9/2002 | Patterson et al. ............... 56/158 |
| 2004/0148919 | A1 * | 8/2004 | Dunn ......................... 56/16.4 R |
| 2005/0016147 | A1 * | 1/2005 | Patterson et al. ............... 56/181 |
| 2005/0284124 | A1 * | 12/2005 | Patterson ........................ 56/364 |
| 2008/0295474 | A1 * | 12/2008 | Tippery et al. ................. 56/14.5 |
| 2012/0047866 | A1 * | 3/2012 | Fuechtling ..................... 56/153 |
| 2014/0237979 | A1 * | 8/2014 | Yanke et al. .................... 56/181 |

* cited by examiner

*Primary Examiner* — Árpád Fábián-Kovács
(74) *Attorney, Agent, or Firm* — Michael J. Striker

(57) ABSTRACT

A header is formed with a middle section disposed on a main frame and at least two side sections disposed adjacent to the middle section on the main frame (2). A finger bar extends across the width of the header. At least one conveyor device (5) is disposed behind the finger bar and designed on the respective side sections as an endless conveyor belt. The belt is disposed adjacent to the middle section in order to transport crop cut by the finger bar laterally in the direction of the middle section (3). Drivable conveying elements are disposed on the middle section adjacent to the finger bar and the respective side section. These conveying elements receive and redirect crop discharged onto the middle section by the respective conveyor belts of the side sections.

13 Claims, 6 Drawing Sheets

HEADER WITH DRIVABLE CROP CONVEYING ELEMENTS

CROSS-REFERENCE TO A RELATED APPLICATION

The invention described and claimed hereinbelow is also described in German Priority Document DE 10 2013 103381.4, filed on Apr. 4, 2013. The German Priority Document, the subject matter of which is incorporated herein by reference, provides the basis for a claim of priority of invention under 35 U.S.C. 119(a)-(d).

BACKGROUND OF THE INVENTION

The invention relates to a header for an agricultural working machine. Conventional headers for agricultural working machines are known. For example, U.S. Pat. No. 8,205,422 B2 teaches a header comprising a main frame on which a middle section and at least two side sections adjacent to the middle section are disposed and, a flexible finger bar extending across the width of the header used to cut the crop. The crop is transported by at least one conveyor device disposed behind the finger bar. The conveyor devices used are conveyor belts equipped with grates and which circulate endlessly on the side sections and convey the crop in the direction of the middle section, transversely to the direction of motion of the header during harvesting. The middle section also comprises an endlessly circulating conveyor belt, which extends in the direction of motion of the header during harvesting and feeds the crop to a harvesting machine on which the header is mounted.

Due to the known design, the conveyor belt of the middle section lies in a plane underneath the finger bar and, therefore, the crop drops onto the conveyor belt when discharged from the belts. A vertical gap remains between the conveyor belt and the adjacent conveyor belts of the side sections. The conveyor belt of the middle section feeds the crop discharged thereupon to a food roller equipped with retractable fingers to convey the crop to a feeder housing of the harvesting machine. The conveyor belt of the middle section does not extend all the way to the finger bar. Instead, a region extending in the direction of conveyance of the conveyor belt remains in which crop can collect behind the finger bar. The crop collected thereat is not captured by the conveyor belt. The feed roller is offset so far toward the rear relative to the finger bar that this feed roller also is not suitable for capturing the crop. When crop collects behind the finger bar, this crop is grasped by the grates on the top side of the conveyor belts of the side sections and is drawn underneath these side sections and then falls onto the ground as a loss.

Such inherent operation is disadvantageous for obvious reasons. A further disadvantage arises in harvesting applications in which the crop, such as grain, is cut closely underneath the fruit to be harvested, whereby the portion of straw in the crop picked up by the header decreases significantly. In the case of grain, it is substantially only ears that reach the particular conveyor belt and, therefore the crop stream has a relatively small volume. When the crop reaches the middle section, the above-described situation results in a marked increase in crop losses at the header.

SUMMARY OF THE INVENTION

The present invention overcomes the shortcomings of known arts, such as those mentioned above.

To that end, the present invention provides a header that is configured to carry away the crop in a better way in the middle section.

In an embodiment, the invention provides a header with a middle section disposed on a main frame and at least two side sections disposed adjacent to the middle section on the main frame. A finger bar extends across the width of the header. At least one conveyor device is disposed behind the finger bar and is designed on respective side sections as a continuous conveyor belt disposed adjacent to the middle section in order to transport crop cut by the finger bar laterally in the direction of the middle section.

Significantly, drivable conveying elements are disposed on the middle section, adjacent to the finger bar and the respective side section. These conveying elements receive and redirect crop discharged onto the middle section by the respective conveyor belts of the side sections. As a result, crop is prevented from collecting directly behind the finger. bar in the middle section of the header. This in turn prevents crop from being drawn underneath the conveyor belts of the side sections by these same conveyor belts. Crop losses are therefore prevented, which is very significant in harvesting applications having low yield in particular.

Preferably, the respective conveying element can have the shape of a circular disk. The installation space claimed by the conveying elements in the middle section can be reduced as a result. In particular, the separation between the middle section and the conveying element can be kept small in order to prevent, to the greatest extent possible, crop from entering the region between the respective conveying element and the middle section.

In addition, the symmetry of the conveying elements ensures that a consistent amount of crop is discharged. The conveying element is preferably configured with structured surface to ensure that the crop located thereon is not slung off before the crop is redirected transversely to the direction of conveyance of the conveyor belts. To this end, the conveying elements are mounted on a vertical rotational axis disposed on the middle section. As a result, a flat design is obtained in the middle region, thereby ensuring that the crop stream is unobstructed.

Particularly advantageously, the respective conveying element has a cover that partially covers the conveying element. The cover prevents crop from becoming deposited onto the rotating conveying elements, thereby ensuring that crop cannot circulate. In an embodiment, the cover has a contour substantially shaped as the sector of a circle. Therefore, only that part of the conveying element is exposed that effectively redirects the crop, i.e., crop arriving from the side sections is redirected by an angle equal to or greater than 90°.

In an embodiment, the cover extends from the rotational axis over the conveying element, substantially in a direction remote from the finger bar. As a result, the crop lying on the circular-disk shaped conveying element can be scraped off and directed/redirected into the preferred direction of conveyance. Put another way, such arrangement prevents the crop from being redirected into the direction of the finger bar.

The cover preferably is formed with a surface having minimal surface roughness. As a result, crop is prevented from being deposited onto the surface of the cover. Crop that reaches the cover from the conveyor belt of the respective side section can slide off this cover and is captured by an intake conveyor device in the middle section of the header.

It also is advantageous that the cover has a convex contour on the side thereof remote from the conveyor belt. As a result, a scraping effect is achieved during intended operation, thereby ensuring that crop lying on the conveying element does not circulate. The convex contour also is particularly favorable in terms of flow and promotes the redirection of crop by the conveying element.

In an embodiment, the convexly contoured side of the cover comprises a ridge having a substantially circular cross-section. As a result, a cutting action by the flat cover, which could be applied on the crop by the outer edge of the cover, is prevented. In addition, crop is largely prevented from becoming stuck between the cover and the conveying element.

Also, the middle section can comprise a rigid floor plate, which is contoured on the top side thereof. The floor plate redirects the crop arriving from the side sections. The contoured floor plate is used to passively guide crop and is supported in this task by the conveying elements disposed on the floor plate. The conveying elements redirect the crop arriving from the side sections until this crop is discharged by being scraped off on the cover. The conveying elements simultaneously accelerate this crop. An intake conveyor device designed as a feed roller can therefore better capture the crop arriving from the most remote regions of the middle section.

As an alternative, the middle section can comprise a belt. The belt extends transversely to the conveyor belts of the side sections in order to convey the crop in the direction of the feeder housing of a combine harvester. In particular, the middle section can comprise a guide element and/or limiting element, which is disposed between the conveying elements. The guide element supports the flow of crop and the capture of the crop by the conveying elements in this region.

In one form, the guide element is designed as a wedge-shaped projection. This wedge-shaped projection is used to redirect crop, in order to improve the crop intake by the feed roller.

The limiting element is designed in one form as a piece of sheet metal standing substantially vertically on the middle section and extending, at least in sections, from the finger bar in the direction of the main frame.

Advantageously, the respective conveying element is drivable by a single electric motor. As a result, an individual control that is adapted to the arrival of crop in the critical regions of the header can be implemented. Potential drive means for the conveying elements are an. electric motor or a hydraulic motor, which could be disposed on the underside of the middle section.

BRIEF DESCRIPTION OF THE DRAWINGS

Further features and advantages of the invention will become apparent from the description of embodiments that follows, with reference to the attached figures, wherein.

DETAILED DESCRIPTION OF THE INVENTION

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

Figure 1:
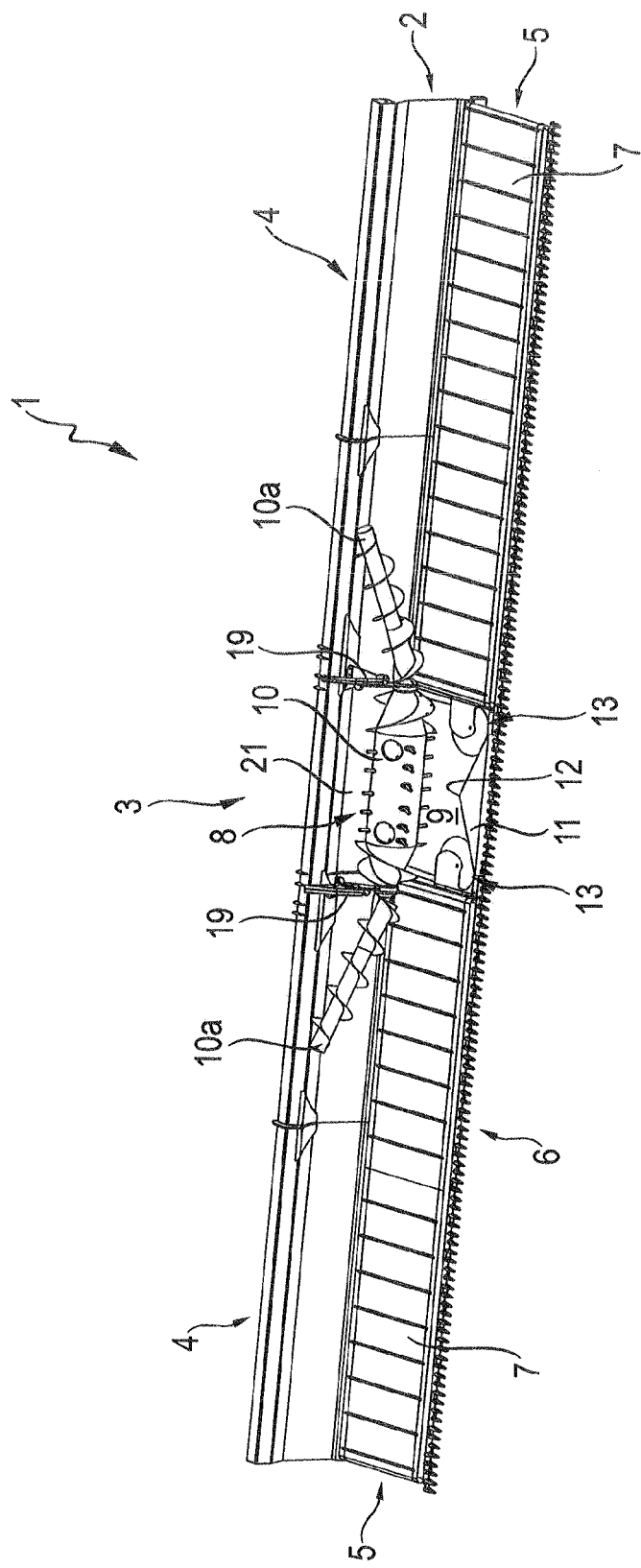
FIG. 1 presents a view of a header constructed in accordance with the inventive principles, diagonally from the front.

FIG. 1 provides a schematic view of a header 1 constructed in accordance with the inventive principles, diagonally from the front. The header 1 comprises a main frame 2 on which a middle section 3 and at least two side sections 4 adjacent to the middle section 3 are disposed. A continuous finger bar 6, which extends substantially across the entire width of the header 1, is disposed on the middle section 3 and the side sections 4 on the front side opposite the main frame 2. Furthermore, non-illustrated reels are disposed on the main frame 2 of the header 1, which extend across the width of one side section 4 and partially across the width of the middle section 3. The reels are used to improve the intake of the crop by the finger bar 6.

The crop out by the finger bar 6 is fed to a conveyor device 5 disposed behind the finger bar 6. Conveyor device 5 comprises at least one endlessly circulating conveyor belt 7 on the respective side sections 4. The endlessly circulating conveyor belts 7 are disposed adjacent to the middle section 3 in order to transport the crop, which is cut by the finger bar 6 parallel to the longitudinal axis of the header 1, in the direction of the middle section 3. The crop conveyed thereby to the middle section 3 is fed to an intake conveyor device 8.

The intake conveyor device 8 is designed as a driveable feed roller 10. The driveable feed roller 10 is mounted on the main frame 2 by frame elements 19. Laterally outwardly extending header augers 10a are assigned to the driveable feed roller 10. The intake conveyor device 8 conveys the crop that has been delivered laterally by the endless conveyor belts 7 to the middle section 3 to an opening 21 that is provided in the main frame 2 and is disposed behind the feed roller 10. The crop is transferred through the opening via a feeder housing, which is located on anon-illustrated combine harvester and to which the header 1 can be attached, to the combine harvester for further processing.

The middle section 3 comprises a rigid floor plate 9, which has a contoured design on the top side thereof facing the feed roller 10, which feed roller 10 is disposed above the floor plate 9. The underside of the floor plate 9 facing the ground has a substantially flat surface. The contoured top side of the floor plate 9 comprises a wedge-shaped projection 11, which is raised above the floor plate 9. The projection 11 tapers from the front edge of the header 1 in the direction of the intake conveyor device 8 and leads into a tip 12 facing the feed roller 10. The projection 11 is used to forcibly redirect the crop in order to redirect the crop delivered by the conveyor belts 7 into the intake region of the intake conveyor device 8 and thereby improve the crop intake by the intake conveyor device 8. The height of the projection 11 above the floor plate 9 can vary in order to ensure that crop is sufficiently redirected.

On the top side of the floor plate 9, conveying means 13 are disposed adjacent to the projection 11. Conveying means 13 support the flow of crop 9 in this corner region directly adjacent to the knife bar 6 and the conveyor belt 7. The conveying means 13 and the mode of operation thereof are described in greater detail in the following by reference to the detailed views in FIGS. 2 to 4.

Figure 2:
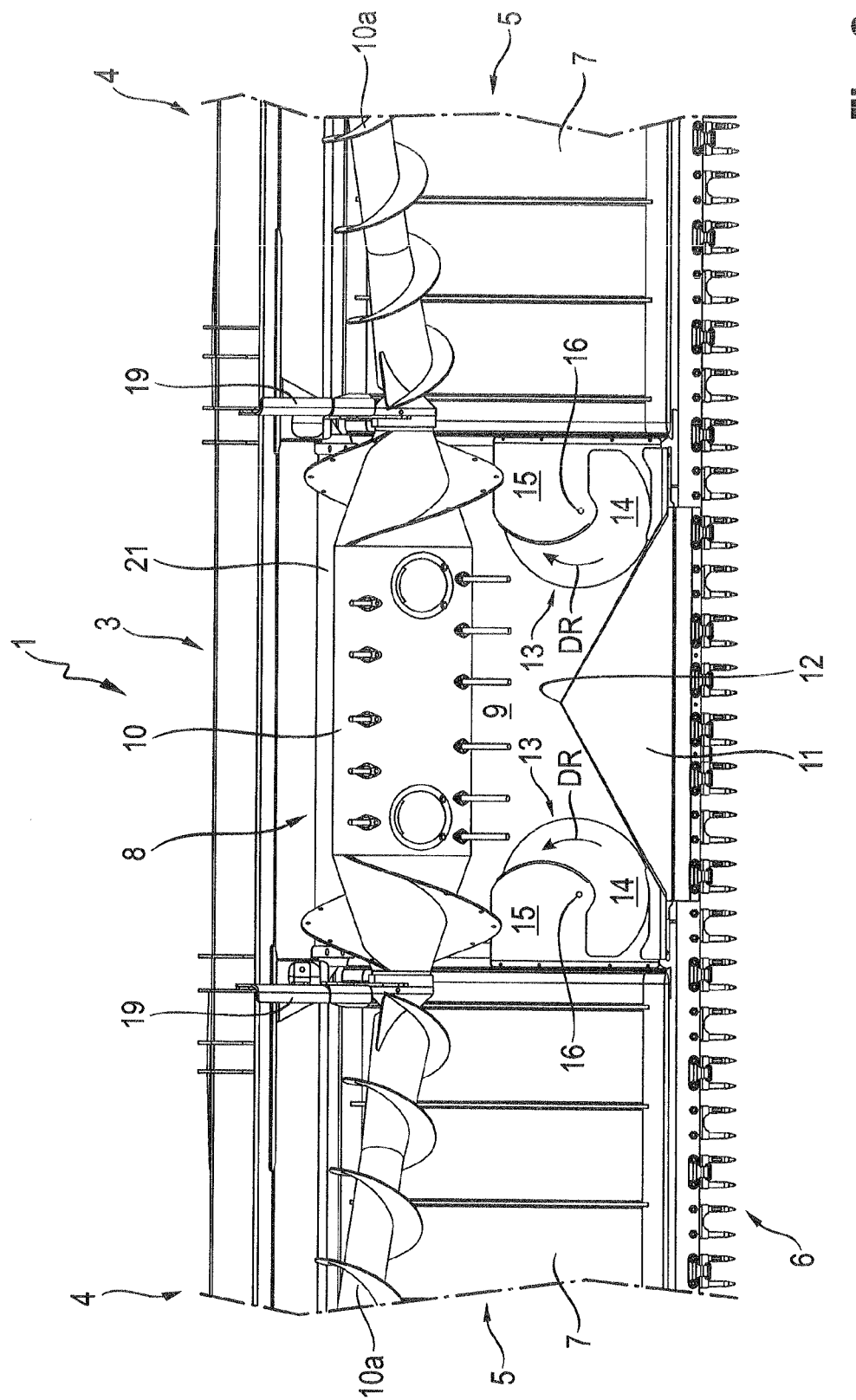
FIG. 2 presents a detailed view of the header depicted in FIG. 1 from above.

FIG. 2 shows a detailed view of the header 1, in particular the middle section 3, from above. The conveying means 13 each comprise a circular-disk shaped, driveable conveying element 14. Each conveying element is mounted on a rotational axis 16 on the floor plate 9 so as to be rotatable in a direction of rotation DR (respectively). The conveying elements 14 rotate oppositely relative to one another, in the direction of the feed roller 10. Each respective conveying element 14 is partially covered by a flat cover 15. The covers 15 have a contour substantially shaped as the sector of a circle, which circle sector covers at least one quadrant of the circular-disk shaped conveying element 14. The at least partial covering prevents crop lying on the conveying element 14 from circulating in entirety with this conveying element The cover 15 extends from the edge thereof facing the conveyor belt 7 in the direction of the rotational axis 16 and from the rotational axis 16 in the direction of the feed roller 10.

The surface of the cover 15 is designed to have minimal surface roughness, thereby ensuring that the crop can slide off of this cover. The placement of the conveying means 13 is selected such that these are located in the corner regions of the floor plate 9 located furthest away from the intake conveyor device 8. The corner regions of the floor plate 9 are limited by the finger bar 6 transversely to the direction of motion of the header 1 and, perpendicularly thereto, by the respective conveyor belt 7. Crop that is not captured by the intake conveyor device 8 will most likely become deposited in these corner regions. The crop discharged by the respective conveyor belts 7 into these corner regions reaches the rotating conveying elements 14 and is carried along and accelerated in the direction of rotation DR.

Figure 3:
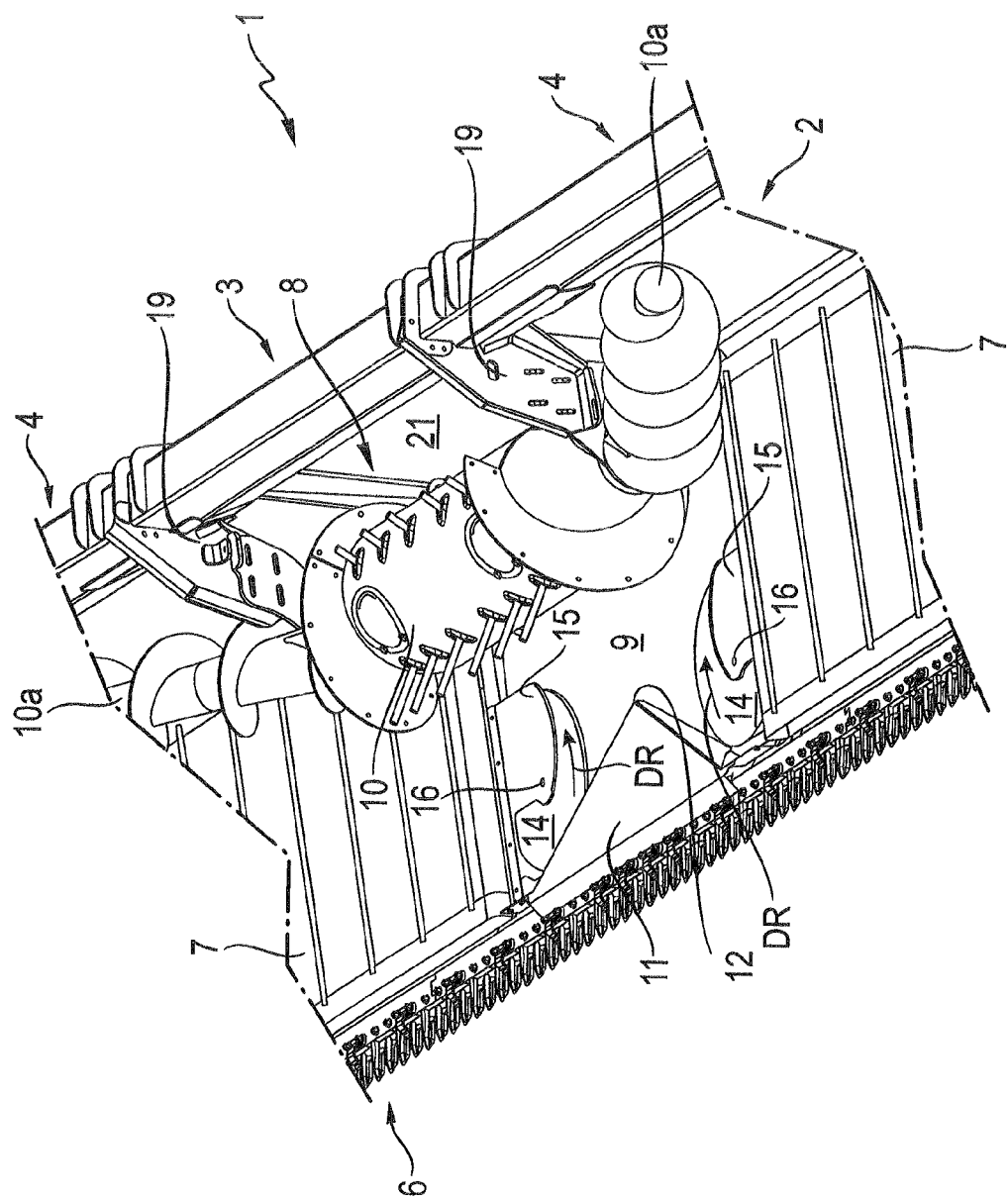
FIG. 3 presents a detailed view of the header depicted in FIG. 1 diagonally from above.

The depiction in FIG. 3 presents a detailed view of the middle region 3 of the header 1, diagonally from above. It is clear that the projection 11 tapers from the knife bar 6 in the direction of the feed roller 10, thereby enabling crop that has been cut by the knife bar 6 to slide onto the floor plate 9 and therefore reach the intake region of the feed roller 10. The conveying element 14 and the cover 15 thereof lie in a plane underneath the top side of the respective conveyor belt 7, which conveys the crop, and so the crop lands thereon when the conveyor belt 7 is redirected by a guide roller.

Figure 4:
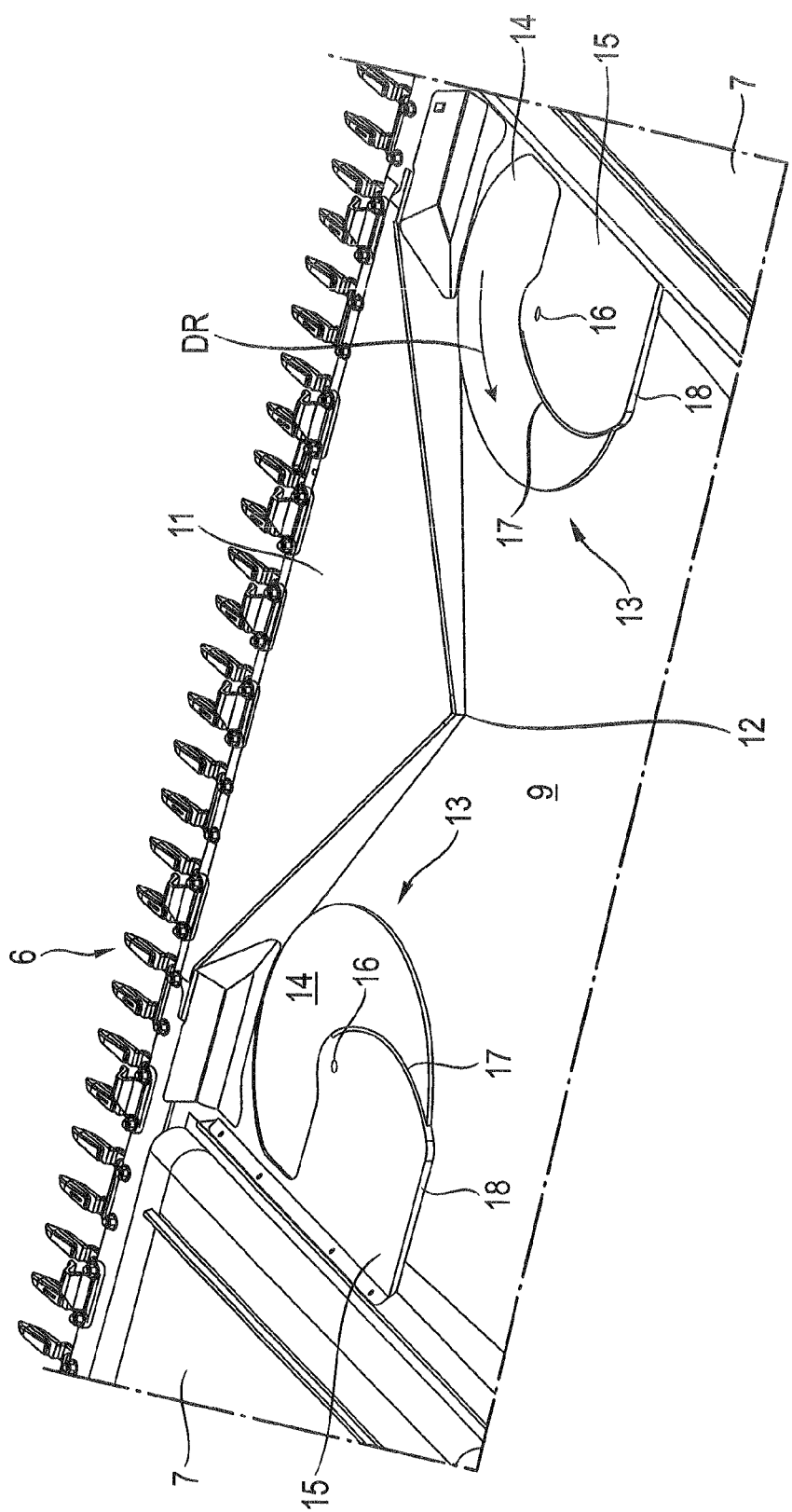
FIG. 4 presents a detailed view of the header depicted in FIG. 1 diagonally from the rear.

FIG. 4 presents a detailed view of the header 1 according to FIG. 1, diagonally from the rear. From this perspective, the contour of the projection 11 with the tip 12 thereof is clearly visible. Furthermore, this view shows the rear region of the respective cover 15, which overlaps the conveying element 14. A scraper 18 is disposed in the rear region of the respective cover 15, which extends, in sections, parallel to the outer edge of the conveying element 14 in the direction of the floor plate 9. The end face of the scraper of the cover 15, which overlaps the conveying element 14, has a ridge 17 having a circular cross-section. The ridge 17 prevents crop from entering or being drawn into the gap between the conveying element 14 and the cover 15 and, due to the rounded shape thereof, prevents the crop from being cut.

The crop that is discharged from the respective conveyor belt 7 onto the middle section 3 reaches the region of the conveying element 14 facing the knife bar 6 and is transported thereby in the direction of rotation DR until this crop impacts the ridge 17 of the cover 15. The crop impacts the ridge 17 of the cover 15 and is scraped off in the direction of the intake conveyor device 8. Crop that is discharged onto the middle section 3 at a slight distance away from the finger bar 6 reaches the cover 15 and slides off of this cover due to the minimal surface roughness. Crop is thereby prevented from collecting in the corner regions, whereby crop from the respective conveyor belt 7 also is prevented from becoming clamped between the conveyor belt 7 and the floor plate 9 and being carried along when this conveyor belt redirects grates on the top side of the conveyor belt 7, whereby this crop can reach the region underneath the conveyor belt 7. The active conveyance of the crop by the conveying elements 14 also ensures that crop cannot collect on the projection 11 behind the knife bar 6, since this crop is carried along by the flow of crop on the conveying elements 14.

Figure 5:
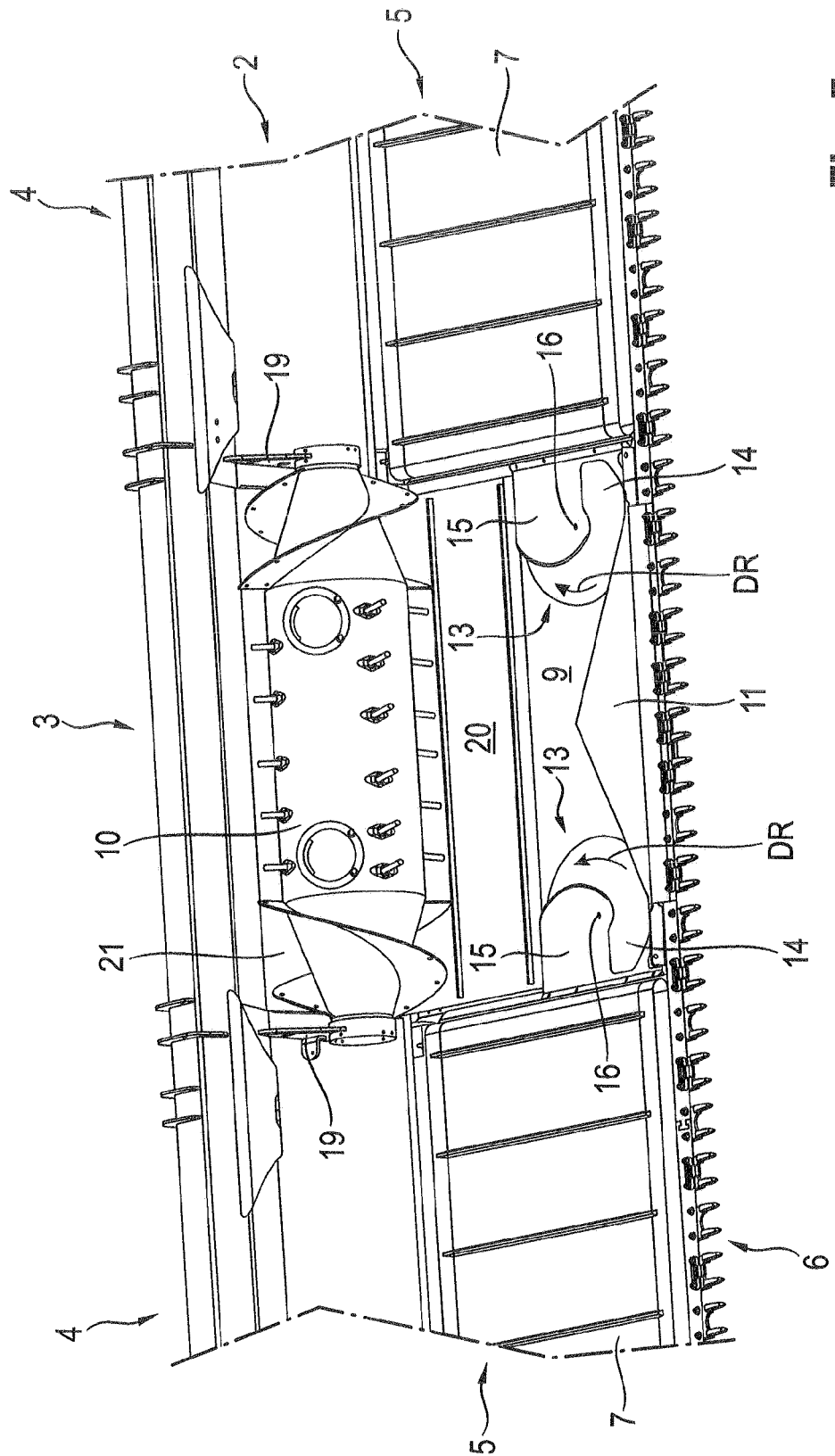
FIG. 5 presents a detailed view of a middle region of an alternative embodiment of a header constructed according to the inventive principles.

FIG. 5 presents a detailed view of the middle region 3 of another embodiment of the header 1. The header 1 differs in that an actively driven, endlessly circulating belt 20 is disposed in the middle region 3 and the feed roller 10 is offset toward the rear, in the direction of the opening 21 in the main frame 2 of the header 1. The belt 20 conveys the crop discharged by the conveyor belts 7 of the respective side section 4 onto the middle section 3 transversely to the direction of conveyance of the conveying belts 7 in the direction of the intake conveyor device 8. As viewed in the direction of conveyance of the belt 20, the floor plate 9, together with the projection 11 thereof and the conveying means 13, adjoins the corner regions, which were described above.

Figure 6:
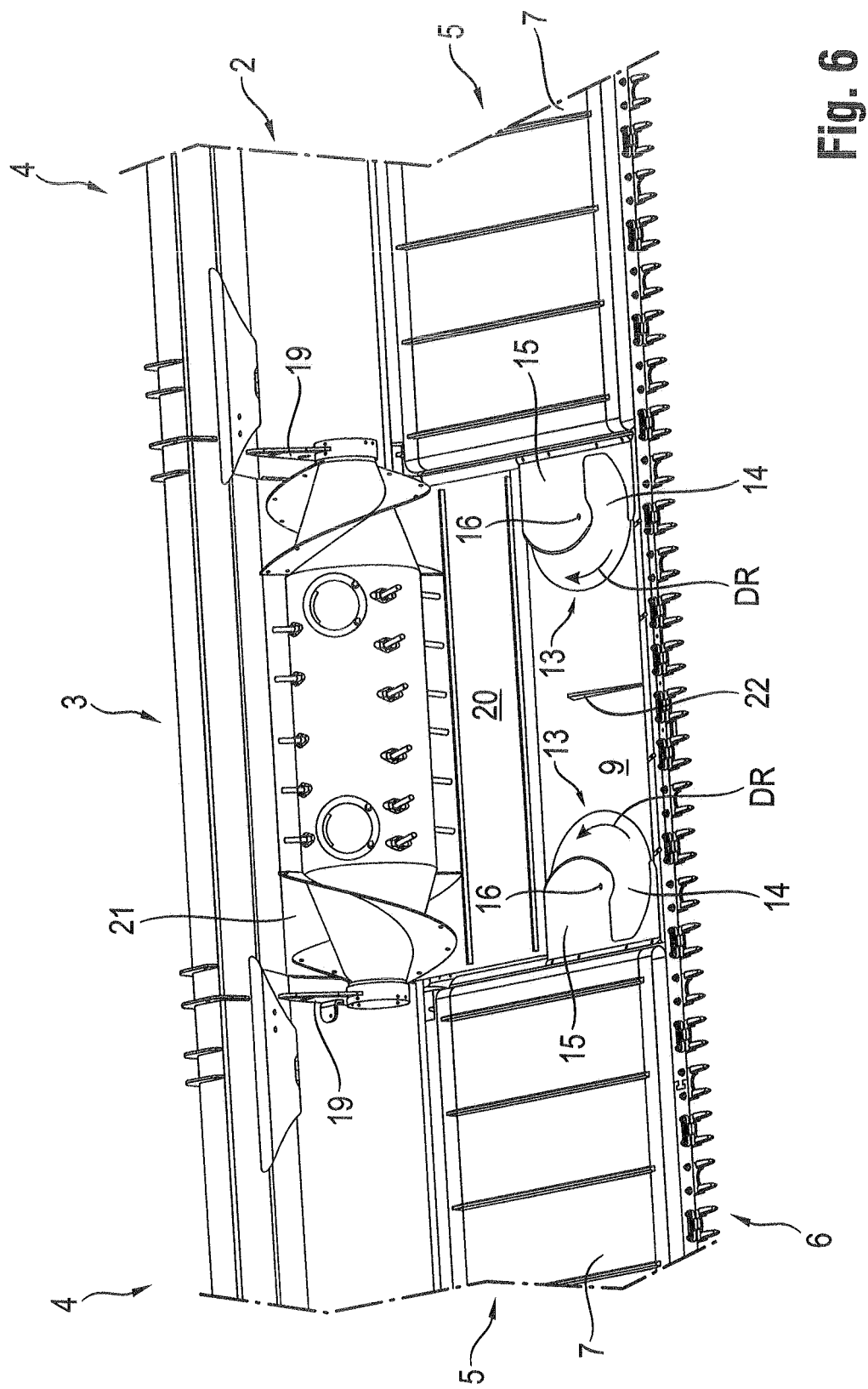
FIG. 6 presents a detailed view of the middle region of the header of FIG. 5, modified according to an alternative embodiment of the invention.

A further embodiment is shown in FIG. 6, which presents a detailed view of the middle section 3 according to FIG. 5. In contrast to the embodiment shown in FIG. 5, the FIG. 6 embodiment requires that the wedge-shaped projection Ills omitted. Instead, the floor plate 9 is divided into two sections by a limiting element 22, which extends upwardly, perpendicularly to the floor plate 9. These two sections extend from the finger bar 6, at least in sections, in the direction of the main frame 2.

LIST OF REFERENCE CHARACTERS 1 header
2 main frame
3 middle section
4 side section
5 conveyor device
6 finger bar
7 conveyor belt
8 intake conveyor device
9 floor plate
10 feed roller
10a intake auger
11 projection
12 tip
13 conveying means
14 conveying element
15 cover
16 rotational axis
17 ridge
18 scraper
19 frame element
20 belt
21 opening
22 limiting element
DR direction of rotation As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A header, comprising:
   a driveable feed roller;
   a middle section, comprising a rigid floor plate that has a contoured top side formed to include a wedge-shaped projection, the middle section disposed on a main frame, and
   two side sections disposed adjacent to the middle section on the main frame,
   a finger bar extending across a width of the header; and
   at least one conveyor device disposed behind the finger bar and arranged on each of the two side sections as at least one continuous conveyor belt adjacent to the middle section in order to transport crop cut by the finger bar laterally in the direction of the middle section,
   wherein the middle section includes a pair of drivable, circular, disk-shaped conveying elements disposed on a top side of the floor plate adjacent to the finger bar and the respective side section to receive and redirect crop discharged onto the middle section by the respective conveyor belts of the side sections to the driveable feed roller, and
   wherein each of the pair of the circular, disk-shaped conveying elements are mounted on a rotational axis on the floor plate and rotate oppositely relative to one another in a direction of the driveable feed roller.

2. The header according to claim 1, wherein the respective conveying element is mounted on a vertical rotational axis disposed on the middle section.

3. The header according to claim 1, wherein the respective conveying element has a cover that partially covers the conveying elements.

4. The header according to claim 3, wherein the cover has a contour substantially shaped as the sector of a circle.

5. The header according to claim 3, wherein the cover extends from a rotational axis over one of the conveying element substantially a the direction remote from the finger bar.

6. The header according to claim 3, wherein the cover has a surface having minimal surface roughness.

7. The header according to claim 1, wherein the middle section has a belt that extends transversely to the conveyor belts of the side sections.

8. The header according to claim 1, wherein the middle section has a rigid floor plate that is contoured on a top side thereof and redirects the crop arriving from the side sections.

9. The header according to claim 1, wherein the middle section comprises a guide element disposed between the conveying elements.

10. The header according to claim 9, characterized in that the guide element is designed as a wedge-shaped projection.

11. The header according to claim 9, wherein the guide element comprises a limiting element designed as a piece of sheet metal standing substantially vertically on the middle section and extending, at least in sections, from the finger bar in the direction of the main frame.

12. A header, comprising:
    a middle section disposed on a main frame, and
    two side sections disposed adjacent to the middle section on the main frame,
    a finger bar extending across a width of the header; and
    at least one conveyor device disposed behind the finger bar and arranged on each of the two side sections as at least one continuous conveyor belt adjacent to the middle section in order to transport crop cut by the finger bar laterally in the direction of the middle section,
    wherein the middle section includes drivable conveying elements disposed thereon adjacent to the finger bar and the respective side section to receive and redirect crop discharged onto the middle section by the respective conveyor belts of the side sections,
    wherein the respective conveying element has a cover that partially covers the conveying elements, and
    wherein the cover has a convex contour on a side remote from the conveyor belt.

13. The header according to claim 12, wherein the convex-contoured side of the cover has a ridge having a substantially circular cross-section.

* * * * *